(12) United States Patent
Kanno

(10) Patent No.: US 7,466,456 B2
(45) Date of Patent: Dec. 16, 2008

(54) APPARATUS FOR TRANSMITTING READ DATA

(75) Inventor: Hiroshi Kanno, Amagasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 1154 days.

(21) Appl. No.: 10/729,140

(22) Filed: Dec. 4, 2003

(65) Prior Publication Data

US 2004/0114199 A1 Jun. 17, 2004

(30) Foreign Application Priority Data

Dec. 9, 2002 (JP) .............................. 2002-356321

(51) Int. Cl.
*H04N 1/00* (2006.01)
(52) U.S. Cl. ............................ 358/426.06; 358/426.03; 358/426.05; 358/426.11; 358/1.15
(58) Field of Classification Search ............ 258/426.06, 258/426.03, 426.05, 426.08, 426.11, 1.15; 382/243, 239
See application file for complete search history.

(56) References Cited

U.S. PATENT DOCUMENTS 5,832,126 A * 11/1998 Tanaka ....................... 382/239

6,101,526 A 8/2000 Mochizuki

FOREIGN PATENT DOCUMENTS

| JP | 10-336466 | 12/1998 |
|---|---|---|
| JP | 2000-196839 | 7/2000 |
| JP | 2001-189806 | 7/2001 |

* cited by examiner

*Primary Examiner*—Cheukfan Lee
(74) *Attorney, Agent, or Firm*—David G. Conlin; Steven M. Jensen; Edwards Angell Palmer & Dodge LLP

(57) ABSTRACT

An apparatus for transmitting read data comprises a document reader 101, a data compression unit 102, a data transmission means and a CPU 104. The document reader 101 reads in a document having been subjected to predetermined data processing. The data compression unit 102 performs compression of the read data with a designated file format. The CPU 104 checks the limitation on transmission capacity set in advance for each data transmission means. When the volume of data compressed for transmission falls within the limited range of transmission capacity set for the data transmission means, the read data is transmitted to a destination designated by the user via the data transmission means designated by the user.

4 Claims, 7 Drawing Sheets

FIG. 2

DESTINATION SETUP TABLE

| NAME | DESTINATION (MEANS)/(ADDRESS) | | CHANGE | LIMITATION (M) |
|---|---|---|---|---|
| Kanno | Mail | Kanno@sc.com | Y | 1 |
| | FTP | ftp.sc.com | | 10 |
| Yamada | Mail | Yamada@sc.com | N | 2 |
| | FTP | | | |
| Tanaka | Mail | Tanaka@sc.com | N | 1 |
| | FTP | ftp.sc.com | | |
| Suzuki's store | Mail | Suzuki@sc.com | | 1 |
| | FTP | ftp.sc.com | Y | 10 |

FIG. 6

FIELD SEPARATION DATA TABLE

~600

| | TEXT | GRAPHIC | TEXT-GRAPHIC | GRAPHIC-TEXT |
|---|---|---|---|---|
| PAGE 1 | 80% | 1% | 79 | 0 |
| PAGE 2 | 10% | 70% | 0 | 60 |
| PAGE 3 | 0% | 90% | 0 | 90 |
| PAGE 4 | 50% | 20% | 30 | 0 |
| PAGE 5 | 25% | 40% | 0 | 15 |
| PAGE 6 | 10% | 0% | 10 | 0 |

FIG. 7

COMPRESSION RATE VARIATION ORDER

~601

| PAGE 1 | PAGE 4 | PAGE 6 | PAGE 3 | PAGE 2 | PAGE 5 |
|---|---|---|---|---|---|

APPARATUS FOR TRANSMITTING READ DATA

FIELD OF THE INVENTION

The present invention relates to an apparatus for transmitting read data, and especially relates to the apparatus for transmitting read data such as a network-compliant scanner connected to a network for transmitting the read data to a destination by selecting appropriate settings corresponding to a data transmission means.

DESCRIPTION OF THE RELATED ART

In general, according to the conventional art for transmitting read data, a single standard setting (default) is set up, and there is no consideration made for the transmission environment.

Therefore, in the attempt to actually transmit the read data, overload of transmission capacity may occur, and when this transmission error occurs, the data had to be read in again.

Patent document 1 proposes overcoming this problem by setting a capacity limitation for each page of the document, by which the total capacity of the transmission is limited.

[Patent Document 1]

Japanese Patent Application Laid-Open No. 2000-196839

However, according to this proposal, the volume of each page is limited, so data generally having a large volume such as image data is degraded to have a lower resolution, and smaller data such as text data are read in with high resolution.

In general, the user does not demand high resolution for text data, but desires image data to be read in with high resolution.

Therefore, according to the proposed method, the data is converted in such a way that is contrary to the intension of the user.

Furthermore, there are cases in which the data volume is only just a little over the limited capacity.

As is disclosed in Patent Document 1, when the document is composed of multiple pages, the total volume of the data is cut down by changing the overall compression rate and/or resolution of each page, but this deteriorates the overall image of the data, and requires all the pages to be subjected to a recompression process so the efficiency of the process is deteriorated.

SUMMARY OF THE INVENTION

Therefore, the present invention aims at providing an apparatus for transmitting read data that is capable of confirming the capacity limitation of transmission data and adjusting the total transmission (transfer) file volume of the read data by increasing the data compression rate page by page, starting from the page that is considered to be affected only minimally by image degradation (image of the page is not deteriorated even if image quality is degraded). Thus, the present apparatus is capable of transmitting to the user at the destination an image that is satisfactory to the user without the occurrence of transmission error caused for example by the capacity limitation set for transmission of data to the destination (server).

The apparatus for transmitting read data having a scanner function, a data transmission function and a data compression function according to the present invention comprises a document reading means for reading a document having been subjected to data processing of a set content; a data compression means for compressing the data read from the document with a designated file format; a data transmission means for transmitting the compressed data to a selectable destination; and a transmission capacity limitation confirmation means for confirming a limitation on a transmission capacity set for each data transmission means, the transmission capacity limitation confirmation means having a function to transmit the read data to a designated destination via a designated data transmission means when it is confirmed that a data volume compressed for transmission does not exceed a limited range of transmission capacity set for the data transmission means.

The present invention reads in via the document reader the document having been subjected to data processing of a determined content, carries out data processing of the read document based on the content set by the user, and thereafter, compresses the read data with a designated file format (such as compression, resolution, color/black-and-white) by the data compression means, by which the scan data is compressed.

Thereafter, the transmission capacity limitation confirmation means confirms the limitation of the transmission capacity set in advance for each data transmission means, and when the data volume compressed for transmission falls within the limited range of transmission capacity set for the data transmission means, the apparatus transmits the read data via the data transmission means designated by the user to the destination designated by the user.

According to the apparatus for transmitting read data of the present invention, the transmission capacity limitation confirmation means comprises a function of determining whether a plurality of other data transmission means different from the initially designated data transmission means are set up when it is confirmed that the data volume compressed for transmission exceeds the limited range of transmission capacity set for the data transmission means; a function of determining whether the other data transmission means is capable of transmitting data with larger transmission volume than the initially designated data transmission means; a function of determining whether the data volume compressed for transmission falls within the limited range of transmission capacity set for the other data transmission means when the other data transmission means is capable of transmitting data with larger transmission volume than the initially designated data transmission means; and a function of transmitting the read data to a set designation via the other data transmission means different from the initially designated data transmission means when it is determined that the data volume compressed for transmission falls within the limited range of transmission capacity set for the other data transmission means.

According to the present invention, when the data volume compressed for transmission exceeds the transmission capacity limitation set for the data transmission means, the transmission capacity limitation confirmation means determines whether there are other data transmission means different from the data transmission means designated initially by the user, and at the same time, determines whether the other data transmission means is capable of transmitting a data having a larger transmission volume than the initially designated data transmission means, and if the other data transmission means is capable of transmitting data having a larger transmission volume than the initially designated means, determines whether the data volume compressed for transmission and subjected to data processing falls within the limited range of transmission capacity set up for the other data transmission means, and if the data volume compressed for transmission falls within the limited range of transmission capacity set for the other data transmission means, transmits the read data to the destination designated by the user via the other data transmission means that is different from the means initially designated by the user.

The apparatus for transmitting read data according to the present invention further comprises a field separation means, the field separation means having a function of performing field separation of a text field and a graphic field within each page of the whole data to be transmitted when it is determined that the data volume compressed for transmission exceeds the limited range of transmission capacity set for the other data transmission means; and the transmission capacity limitation confirmation means comprises a function of designating an order for performing recompression process of each page in the order of size of the text field or the graphic field obtained by field separation; a function of carrying out the recompression process one page at a time in the determined order; a function of determining whether the data volume compressed for transmission falls within the limited range of transmission capacity set for the other data transmission means whenever a page is recompressed; and a function of transmitting the read data to the set destination via the other data transmission means when it is determined that the data volume compressed for transmission falls within the limited range of transmission capacity set for the other data transmission means.

According to the present invention, in the data transmission means having set thereto the data that the user wishes to transmit, when it is determined that the data volume compressed for transmission exceeds the limited transmission capacity set up for the other data transmission means, the field separation means carries out field separation for each page of the overall data that the user wishes to transmit.

The transmission capacity limitation confirmation means designates the order for recompressing each page based on the size of the text region or graphic region determined by field separation, and performs recompression process of each page in that order. Further, whenever a page is recompressed, the apparatus checks whether the data volume compressed for transmission falls within the limited range of transmission capacity set for the other data transmission means, and when it is determined that there is no problem in transmitting the data, the read data is transmitted to the destination designated by the user via the other data transmission means designated by the user.

In the present apparatus for transmitting read data, the transmission capacity limitation confirmation means comprises a function of determining whether a page consists of only the text field as a result of the field separation means performing field separation of all the pages of the data to be transmitted, and a function of degrading a resolution of the page when it is determined that the page consists of only the text field by field separation.

According to the present invention, after subjecting all the pages of the data to be transmitted to field separation by the field separation means, when it is determined that a page consists of only the text field, the resolution of that particular page is degraded.

Moreover, whenever a page is subjected to data compression (degradation of resolution), a check is performed to see whether the data volume compressed for transmission falls within the limited range of transmission capacity set up for the other data transmission means, and when it is considered that there is no problem in transmitting the data, the read data is transmitted to the destination designated by the user using the other data transmission means designated by the user.

According further to the apparatus for transmitting read data of the present invention, the field separation means comprises a function of performing field separation of the read document, and the transmission capacity limitation confirmation means comprises a function of determining whether the document having been subjected to field separation is a black-and-white document, and a function of converting a page data of the black-and-white document to a black-and-white image when it is determined that the document having been subjected to field separation is a black-and-white document.

According to the present invention, when the field separation means carries out field separation of the read document, it also determines whether the document is a color document or a black-and-white document, and when it is determined that the document is a black-and-white document, the page data of the black-and-white document is converted into black-and-white image.

Then, a check is performed to see whether the data volume compressed for transmission falls within the limited range of transmission capacity set for the other data transmission means, and when it is considered that there is no problem in transmitting the data, the read data is transmitted to the destination designated by the user using the other data transmission means designated by the user.

BRIEF DESCRIPTION OF THE DRAWINGS

FIG. 2 is an explanatory view showing one example of a destination setup table set by the user through an operation unit of the apparatus for transmitting read data of the present invention;

FIG. 6 is an explanatory view showing one example of a field separation data table created by the field separation order data creation process;

FIG. 7 is an explanatory view showing one example of the order for varying the compression rate of each page, the order corresponding to the size of the text field and the graphic field determined by field separation.

DETAILED DESCRIPTION OF THE PREFERRED EMBODIMENT

A preferred embodiment of the present invention will now be explained in detailed with reference to the drawings.

Figure 1:
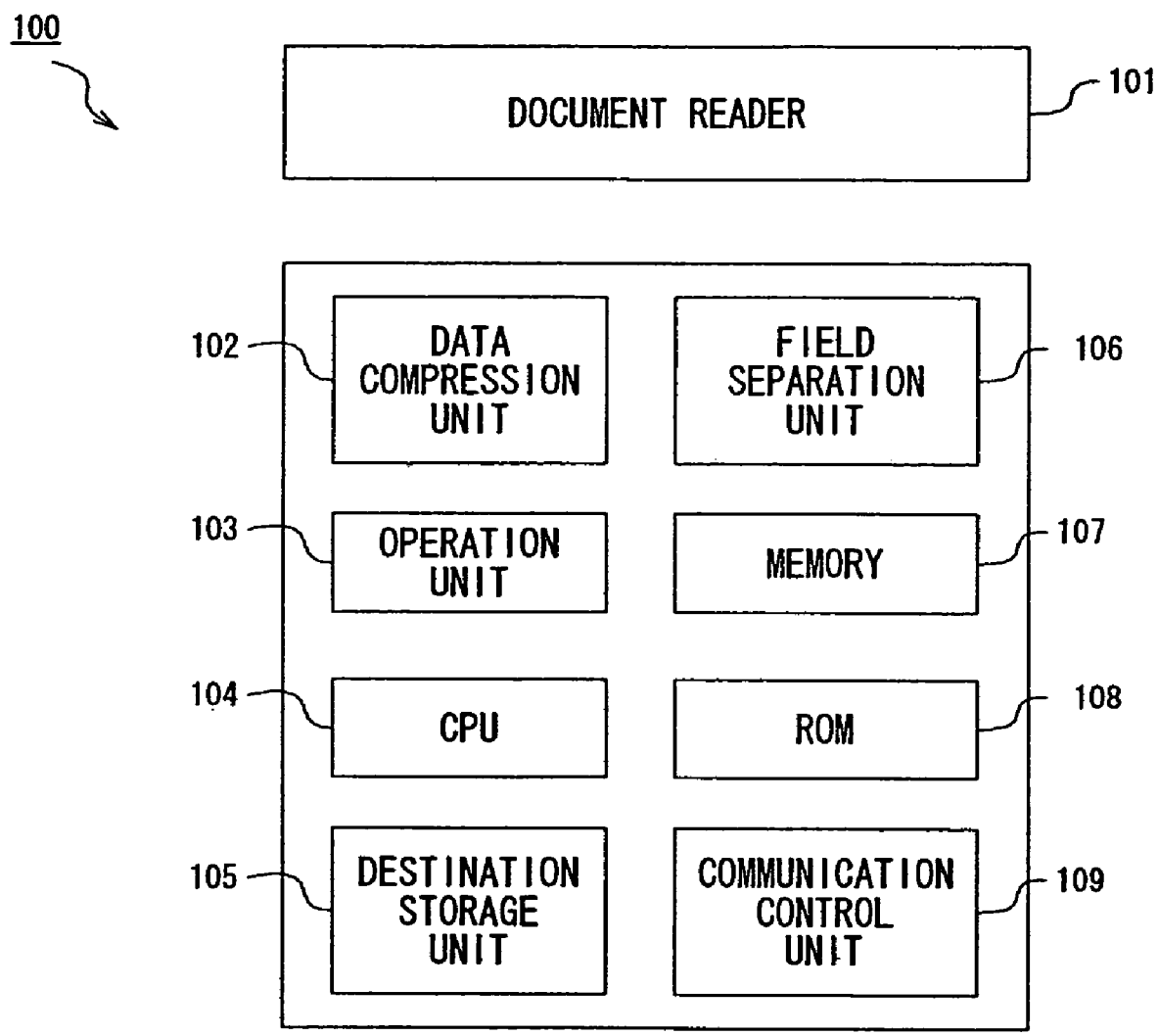
FIG. 1 is an explanatory view showing an outline of the basic configuration of a scanner according to one embodiment of the apparatus for transmitting read data of the present invention.

FIG. 1 is an explanatory view illustrating the outline of the basic structure of a scanner, which is one embodiment of the apparatus for transmitting read data according to the present invention.

The apparatus for transmitting read data according to the present invention is equipped with a scanner function, a data transmission function and a data compression function, and comprises a document reader 101 which is a document reading means that reads a document while performing data processing of a determined content, a data compression unit 102 which is a data compression means for compressing the data read from the document with a designated file format, a data transmission means for transmitting the compressed data to a selectable destination, and a CPU (central processing unit) 104 which is a means for confirming the limitation on the transmission capacity determined for each data transmission means. The present apparatus is further equipped with a function of transmitting the read (scanned) data to a selected destination via a designated data transmission means when the CPU 104 confirms that the compressed data capacity for transmission does not exceed the limitation range of the transmission capacity determined for the data transmission means.

In the apparatus for transmitting read data according to the present invention, the CPU 104 comprises a function of judging, after confirming that the compressed data capacity to be transmitted exceeds the limited range of transmission capacity set up for the data transmission means, whether multiple data transmission means other than the initially designated data transmission means are set up; a function of judging whether the other data transmission means is capable of transmitting data with a larger transmission volume than the initially designated data transmission means; a function of judging whether the compressed data capacity for transmission falls within the limited range of transmission capacity set for the other data transmission means when the other data transmission means is capable of transmitting data having a larger transmission volume than the primarily designated data transmission means; and a function of transmitting the read data to the designated destination via the other data transmission means that is different from the initially designated data transmission means when the compressed data capacity to be transmitted is judged to be within the limitation range of transmission capacity set up for the other data transmission means.

The apparatus for transmitting read data according to the present invention further comprises a field separation unit 106 which is a means for separating a page into fields, and when it is determined that the compressed data capacity for transmission exceeds the limited range of transmission capacity set for the other data transmission means, the field separation unit 106 separates the data of each page of the whole document data into a text field and a graphic field. Further, the CPU 104 is equipped with a function of designating an order for recompressing each page based on the size of the separated text field or the graphic field of each page, a function of performing recompression of each page in the designated order, a function of judging whether the compressed data volume for transmission falls within the limited range of transmission capacity determined for the other data transmission means whenever a page has been recompressed, and a function for transmitting the read data to a selected destination via the other data transmission means when it is determined that the compressed data capacity for transmission falls within the limited range of transmission capacity set up for the other data transmission means.

According to the present apparatus for transmitting read data, the CPU 104 is equipped with a function of judging, as a result of the field separation unit 106 separating each page of the whole data to be transmitted into fields, whether the page consists only of text fields, and a function of degrading the resolution of that particular page when the page having been subjected to field separation consists only of text fields.

Further, the field separation unit 106 comprises a function of carrying out field separation of the document being read, and the CPU 104 further comprises a function of judging whether the document having been subjected to field separation is a black-and-white document, and a function of converting the page data of the black-and-white document into black-and-white image.

In FIG. 1, reference number 100 shows the basic structure of a scanner, which is the apparatus for transmitting read data.

As shown in FIG. 1, the scanner comprises a document reader 101, a data compression unit 102, an operation unit 103, a CPU 104, a destination storage unit 105, a field separation unit 106, a memory 107, a ROM (read only memory) 108 and a communication control unit 109.

By switching the power on the scanner, the CPU 104 executes the program stored in the ROM 108, and the operation unit 103 displays the set values and the like stored in the memory 107. An administrator can carry out administrative tasks such as correction of the default value, and a general user can carry out such operations as setting of the destination, reading of the actual data and transmitting of the data, and the data including the set values are stored in the memory 107.

As for the operation for reading the actual data, the data for transmission is read from the document through the document reader 101, stored temporarily in the memory 107, the destination address is read out from the destination (address) area 203 of the destination storage unit 105, the data is subjected to compression process at the data compression unit 102 if required according to the set contents, and the read-in data is transmitted from the communication control unit 109 via a network to the destination.

Furthermore, the document data is subjected to field separation at the field separation unit 106.

FIG. 2 is an explanatory view showing one example of a destination setup table that the user sets up through the operation unit of the apparatus for transmitting read data according to the present invention.

As for the destination, as shown in FIG. 2, a transmission setup table 200 is created in which the destination is set up in advance.

The user can select a destination using its name 201.

In the table, the user sets up a destination (means) 202 indicating the data transmission means for transferring (transmitting) data to the destination, and a destination (address) 203 designating the address used in the network.

Furthermore, in a change 204 field indicating whether change is possible or not possible, the user inputs whether to allow the attempt to transmit the read data via a different data transmission means when overload of transmission capacity limitation occurs in the data transmission means initially designated for data transmission.

Even further, the user (or administrator) sets up a value in a limitation (M) 205 field for limiting the transmission (transfer) capacity allowed for each data transmission means, and this data is compared with the volume of the read data when performing transmission of the read data.

As for the limitation of transmission capacity, in general, sending an e-mail having a volume exceeding 1 MB (megabyte) is considered to be breaching of manners, and in practice, a mail exceeding the handling capacity of the mail server for transmitting mails can be deleted.

Similarly, as for FTP (file transfer protocol), if a file having a volume exceeding the capacity of the storage unit of a server is transmitted via FTP, the file may be deleted by the administrator. Therefore, it is necessary to control the volume of the data being transmitted.

Figure 3:
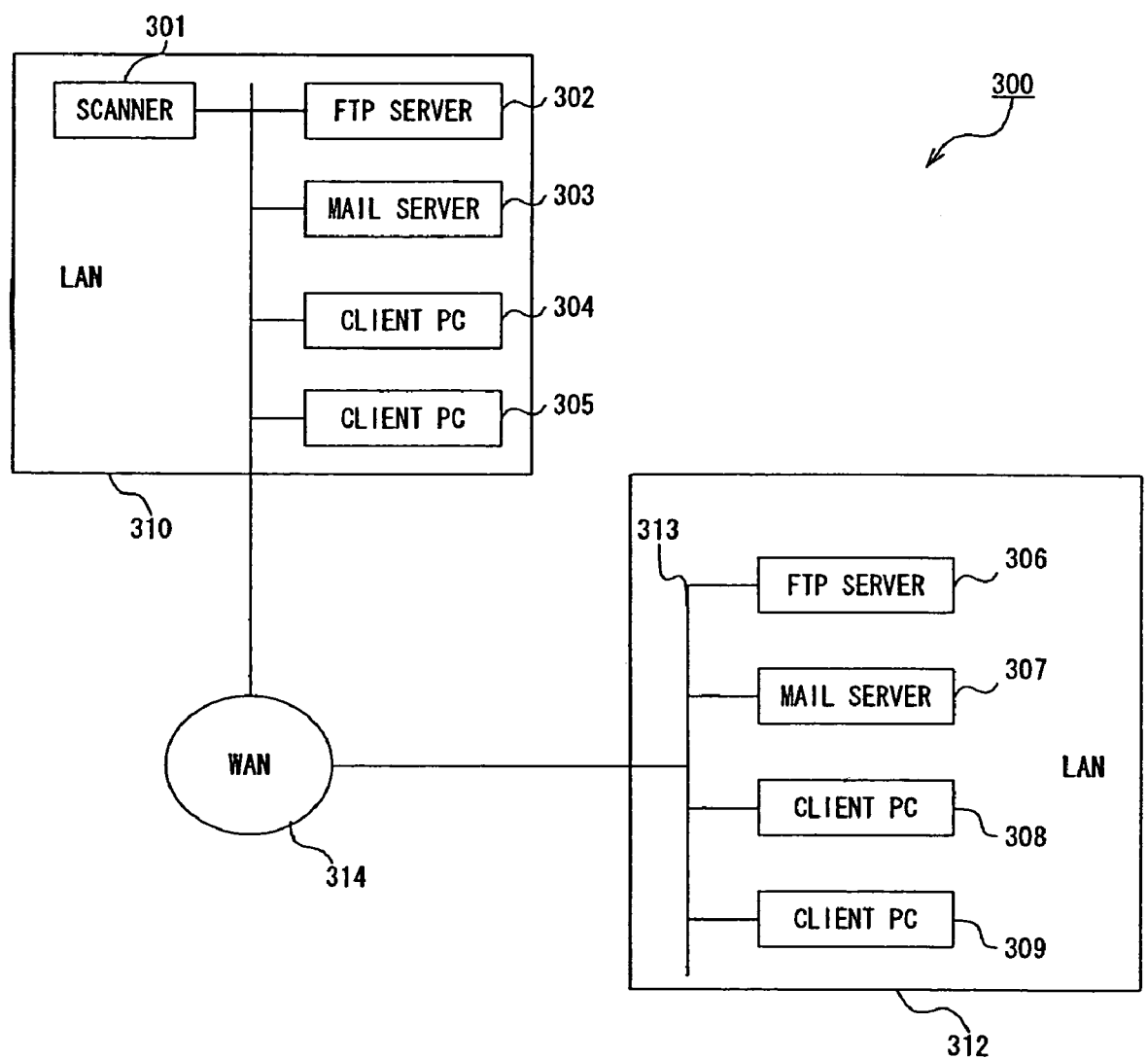
FIG. 3 is an explanatory view showing a network configuration in which the apparatus for transmitting read data of the present invention is connected to the network.

FIG. 3 is an explanatory view showing the network configuration in which the present apparatus for transmitting read data is connected to a network.

In FIG. 3, reference number 300 denotes a network configuration in which the scanner being the apparatus for transmitting read data is connected to the network.

As illustrated in FIG. 3, a LAN (local area network) 310 comprises a scanner 301, an FTP server 302, a mail server 303, a client PC (personal computer) 304 and a client PC 305 connected to a network 311.

Further, a LAN 312 comprises an FTP server 306, a mail server 307, a client PC 308 and a client PC 309 connected to a network 313.

The LAN 310 and the LAN 312 are mutually connected via a WAN (wide area network) 314.

According to the network configuration 300 of FIG. 3, when data is to be used within LAN 310, the data read via the scanner 301 is transmitted temporarily to the FTP server 302 or mail server 303, and then the read data stored in the server 302 or 303 in the form of FTP or mail is transferred to the client PC 304 or client PC 305 that the user is using.

The network configuration also allows data read via the scanner 301 to be transmitted to a destination outside the office.

When data transmission is carried out via mail, the data read in via the scanner 301 is temporarily stored in the mail server 303 within the LAN 310, and then transmitted-via the WAN 314 to the mail server 307 within the LAN 312 of the destination.

The user at the destination enquires whether a mail has been transmitted to the mail server 307 through use of a client PC 308 or client PC 309, and when there is, receives the data from the mail server 307.

In the case of FTP, the data read in through the scanner 301 is transmitted via the WAN 314 directly to the FTP server 306 accessible from the user at the destination, without being routed via the FTP server 302 within LAN 310.

The user at the destination receives a notice in advance via a data transmission means such as a mail notifying that data is received in the FTP server 306, and retrieves the transmitted data from the FTP server 306.

There exist many prior art methods for notifying transmission complete of read data to the destination of FTP, such as the user calling the destination and directly notifying that data is transmitted thereto via FTP, or the scanner 301 automatically sending a notice mail to the user or destination, and so on.

The present invention provides means for transmitting data from the user using the above-mentioned configuration that overcomes the problems of the prior art explained previously.

In the present embodiment of the invention, the term "compression" includes not only file compression of the file format, but also cut down of data volume by degrading resolution, similar to the case of patent document 1.

If the document is in black and white, data volume can be cut down by treating the data as a black-and-white document and not as a color document.

Figure 4:
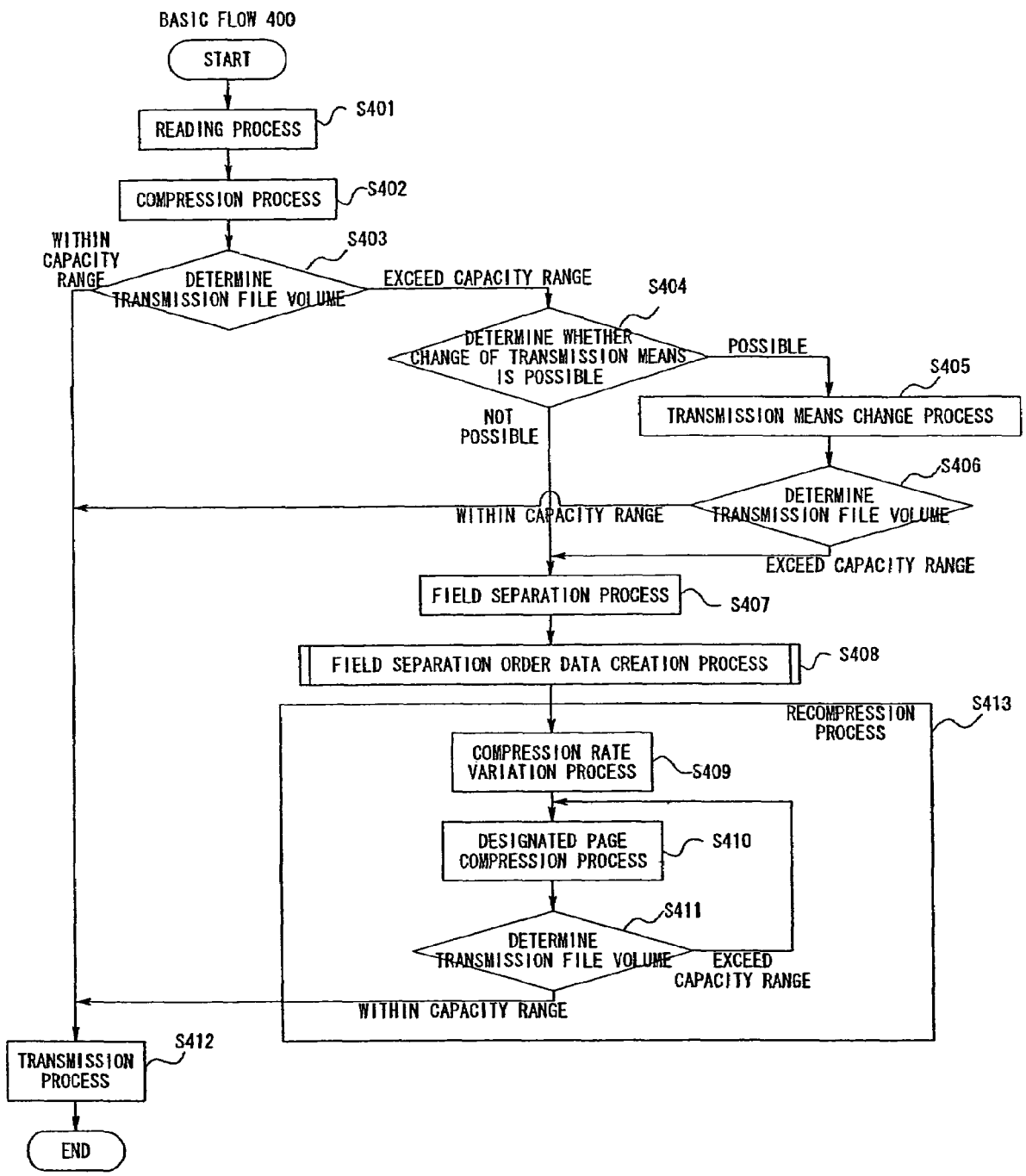
FIG. 4 is a flowchart explaining the basic process flow according to the apparatus for transmitting read data of the present invention.

FIG. 4 is a flowchart explaining the basic process flow according to the apparatus for transmitting read data of the present invention.

The basic process flow of the present invention will now be explained with reference to basic flow 400 illustrated in FIG. 4.

First, data processing is carried out based on the destination and data format designated by the user.

The document is subjected to a reading process using a document reader 101 (step S401).

The read data is subjected to a compression process (step S402), in which the data is compressed with a file format designated by the user.

The compressed file is then subjected to transmission file volume determination corresponding to the limitation on the transmission capacity of the data transmission means set in advance by the user (including the administrator) (step S403).

In the transmission file capacity determination of step S403, when it is determined that the volume of the compressed data file to be transmitted falls within the set capacity range limiting the transmission capacity of the data transmission means and that there is no problem in transmitting the data, the transmission process is carried out (step S412), in which the read data is transmitted to a transmission destination designated by the user, and the transmission process is terminated.

When it is determined in the transmission file volume determination step S403 that the volume of the compressed data file to be transmitted exceeds the set capacity range limiting the transmission capacity of the data-transmission means and that there exists a problem in transmitting the data, the procedure carries out a transmission means change determination (step S404), in which the procedure determines whether plural data transmission means are set up, and whether or not changing of the data transmission means is allowed.

When it is determined in the transmission means change determination of step S404 that it is possible to change the data transmission means, the procedure carries out a transmission means change process (step S405).

In detail, if a multiple number of data transmission means has been set up in the destination (means) column 202 and the changing of data transmission means is set possible in the change column 204 of the destination setup table 200 shown in FIG. 2, or if the user voluntarily changes the data transmission means, the data transmission means is changed in the transmission means change process of step S405 to a means capable of transmitting a larger volume of file data than the initially set data transmission means.

After changing the data transmission means, the determination of transmission file volume is performed (step S406), wherein the limitation on the transmission capacity that can be transmitted via the data transmission means is read out from the limitation (M) column 205, and in the transmission file capacity determination of step S406, the volume of the compressed data file to be transmitted is compared with the limited capacity of the transmission capacity set up for the changed data transmission means to determine whether the file data is transmittable.

When it is determined in the transmission file capacity determination of step S406 that the volume of the compressed data file to be transmitted falls within the capacity range of the transmission capacity set up for the changed data transmission means, transmission process is carried out (step S412) in which read data is transmitted to the destination designated by the user, and transmission process is terminated.

When it is determined in the transmission means change determination of step S404 that the data transmission means cannot be changed, or when it is determined in the transmission file capacity determination of step S406 that the volume of the compressed data file to be transmitted exceeds the limitation of the transmission capacity set up for the changed data transmission means, a field separation process is carried out by the field separation unit 106 (step S407).

In detail, when it is determined in the transmission means change determination of step S404 that no plural data transmission means are set up, or that the data transmission means is not changeable, or if the user voluntarily determines not to change the data transmission means, or further, when it is determined in the transmission file capacity determination of step S406 that the volume of the compressed data file to be transmitted is still too large, the field separation process is performed (step S407).

By the field separation process of step S407, the field ratio of texts to graphics on each page is computed, for example.

The data having been subjected to field separation is then subjected to field separation order data creation process (step S408). In the field separation order data creation process of step S408, designating of order is performed to determine in what order the recompression process of each page should be carried out.

The field separation order data creation process of step S408 will be explained in further detail separately.

After performing ordering of the recompression process for each page, a compression rate variation process is carried out (step S409) in which the data compression rate set up by the user is enhanced.

Thereby, the reversibility of the read data is deteriorated but the file volume can be cut down.

Next, compression process of a designated page is performed (step S410), wherein according to the order of recompression process of each page determined in advance by the field separation order data creation process of step S408, recompression of each page is carried out in the compression process of the designated page in step S410.

The recompressed page data is integrated with the other pages, and the data is subjected once again to the transmission file volume determination (step S411), in which the volume of the recompressed page data file to be transmitted is compared with the limited capacity of the transmission capacity set up for the changed data transmission means, thereby determining whether the page data is transmittable or not.

When it is determined in the transmission file volume determination of step S411 that the volume of the recompressed paged at a file to be transmitted falls within the limited capacity range set up for the changed data transmission means, transmission process is carried out (step S412) according to which the read data is transmitted to the destination designated by the user, and the transmission process is terminated.

When it is determined in the transmission file volume determination of step S411 that the volume of the recompressed page data file to be transmitted exceeds the limited capacity range of the changed data transmission means, the procedure returns to step S410, in which the next page in the set up order is subjected to the compression process of the designated page of step S410, then the procedure advances to the transmission file capacity determination of step S411, and these steps are alternately repeated as needed.

By the basic process explained above, the file designated by the user can be transferred (transmitted) without deteriorating the image on each page of the data to be transmitted.

In this basic process, there may be a case in which the volume of the transmission file does not fall within the limited range even after all pages of the file are recompressed.

In such case, a recompression process is carried out (step S413) so as to further enhance the compression rate based on the setting by the user etc., and during the recompression process of step S413, the compression rate variation process of step S409, the designated page compression process of step S410 and the transmission file volume determination process of step S411 can be carried out.

By further enhancing the data compression rate of the pages during the recompression process of step S413, there may be a case in which the image quality is greatly deteriorated from what the user has in mind, so in order to overcome this problem, it is possible to adopt conventional means such as dividing of files.

Figure 5:
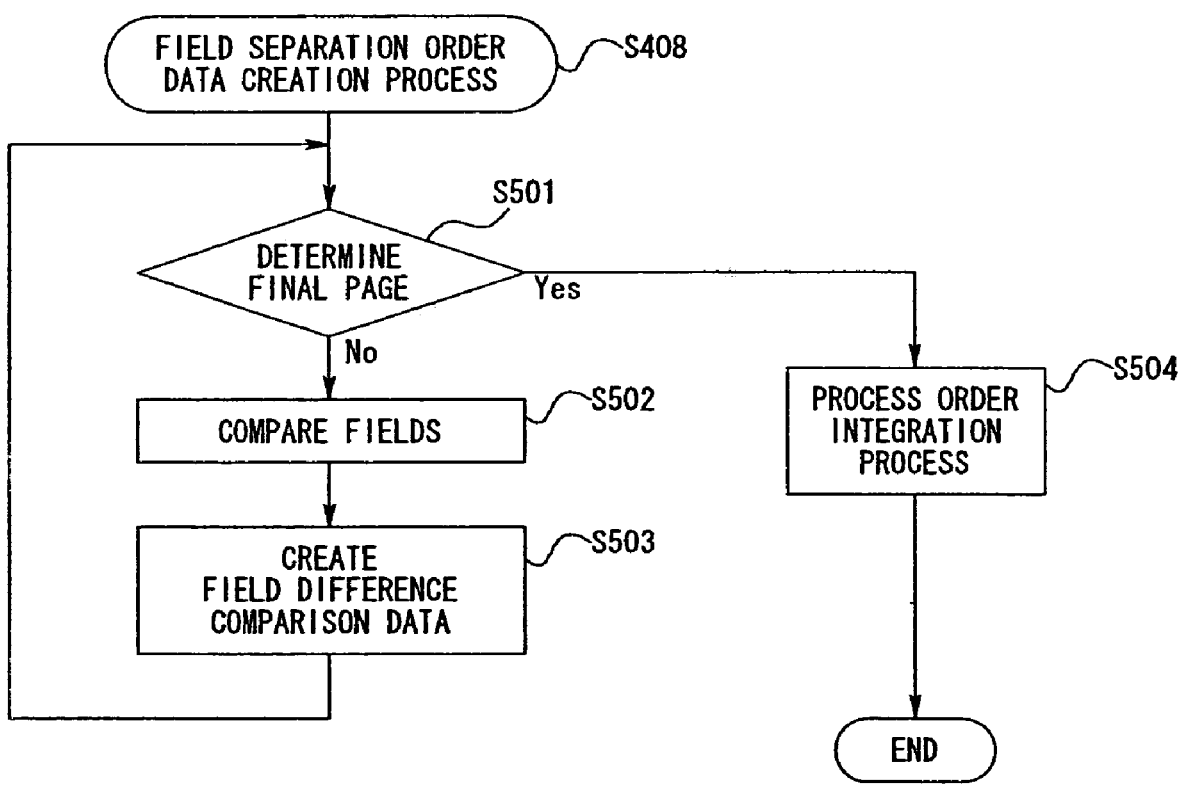
FIG. 5 is a flowchart explaining the details of the process flow for creating a field separation order data according to the apparatus for transmitting read data of the present invention.

FIG. 5 is a flowchart explaining in detail the flow of field separation order data creation process in the read data transmission apparatus according to the present invention.

FIG. 6 is an explanatory view showing one example of a field separation data chart created by the field separation order data creation process.

FIG. 7 is an explanatory view showing one example of a compression rate variation order of the pages having been subjected to ordering based on the size of the text field or graphic field obtained by field separation.

The details of the field separation order data creation process of step S408 will now be explained.

First, determination of the final page is carried out in order to compare the field separation process data of all the pages (step S501).

If the page is not the final page (step S501 "No"), field comparison is carried out (step S502), based on which the ratio of the text field to the graphic field of each page is computed, as shown in the field separation data table 600 of FIG. 6.

Thus, as shown in FIG. 6, the values of the text field ratio and the graphic field ratio of the field separation data table 600 are calculated.

Next, field difference comparison data are created (step S503).

When it is determined that the data corresponds to the final page (step S501 "Yes"), a process order integration process is carried out (step S504).

The field separation data table 600 shown as one example in FIG. Vindicates the result of calculation of the difference between the text field ratio and the graphic field ratio, wherein the calculated value is entered in the field having the larger ratio.

According to this table, the order of pages having the highest text field rate and the order of pages having the highest graphic field rate are recognized.

Regarding reversibility of data, in general, the data compression rate of text data can be enhanced to a certain extent without deteriorating the text recognition rate.

In contrast, the enhancement of data compression rate of a graphic data results in the deterioration the graphic image.

From the above, in designating the processing order of the field separation pages, the pages with higher text field ratio are designated with earlier order for processing.

As for the pages with higher graphic field ratio, the greater the graphic field ratio in a page, the more efficiently the file volume can be cut down with even only a small increase of compression ratio, so in order to suppress the deterioration of reversibility of page data with smaller graphic fields, the pages with greater graphic fields are designated with earlier processing order. Accordingly, the compression rate variation order 601 as shown in FIG. 7 is determined.

However, according to some ways for utilizing the read data at the destination, there may be cases where this ordering process cannot be applied.

For example, if the user at the destination is planning to subject the read data to text recognition processing using an OCR (optical character reader), it is clear that the enhancement of the compression ratio of the page with greater text field ratio deteriorates the text recognition rate at the destination.

Therefore, according to how the read data is utilized at the destination, it is possible to omit a page from the compression rate variation order 601 shown in FIG. 7 so as not to subject a page with high text field ratio to the recompression processing of step S413.

Further, as mentioned earlier, other than the variation of the compression rate on the file format, the data compression rate can be enhanced by decreasing the resolution of pages when using the document reader 101.

Especially, in the field separation data table 600 of FIG. 6, the data corresponding to page 6 contains only text fields in the page, and no graphic field is recognized.

In such case, for example, the resolution of page 6 can be dropped from 600 dpi to 300 dpi so as to cut down the file volume to approximately one-fourth, and by further subjecting the file to compression process of the file format, a page file with smaller file volume can be created.

It is common knowledge that other than texts of language with low text recognition rate such as Chinese characters, the degradation of resolution does not seriously affect the text recognition performed by OCR. Therefore, the variation of resolution is an effective compression method especially with regard to the text region.

Figure 8:
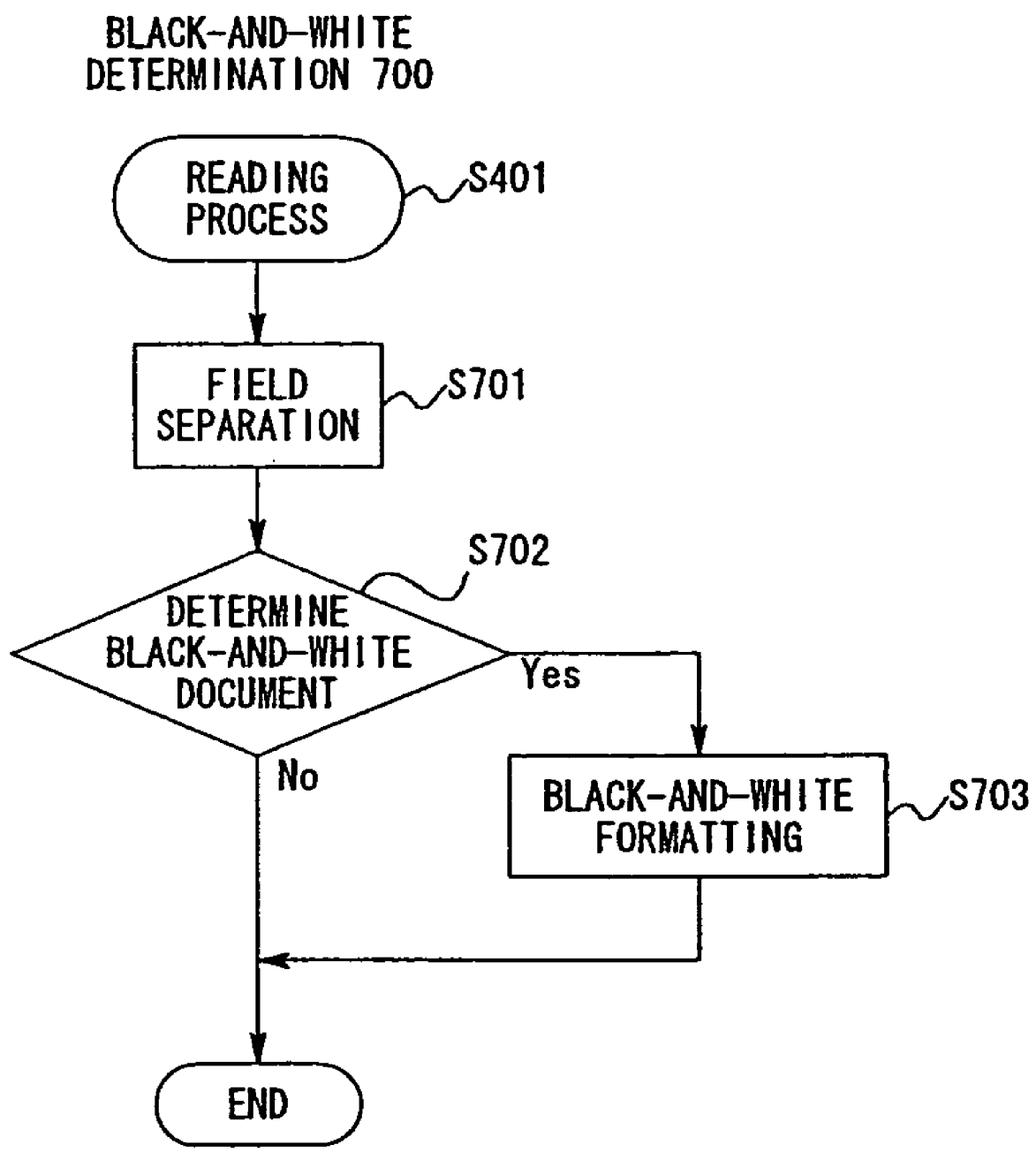
FIG. 8 is a flowchart explaining in detail the flow of document reading process according to the apparatus for transmitting read data of the present invention.

FIG. 8 is a flowchart showing the details of the flow of document reading process according to the apparatus for transmitting read data of the present invention.

The details of the black-and-white determination process 700 shown in FIG. 8 will now be explained.

During document reading process of step S401, field separation is carried out (step S701), and black-and-white determination is performed so as to determine whether color images are contained in the document (step S702).

At this time, if the document is determined to be a black-and-white document (step S702 "Yes"), the read-in data is subjected to black-and-white formatting (step S703).

Thereby, the data volume of the black-and-white document is cut down to approximately one-fourth of the document stored as color data, and the data can be compressed efficiently.

Further, if the user wishes to subject the data to text recognition processing by OCR, by carrying out the black-and-white formatting process of step S703 to only the data containing text fields within the page, the text recognition rate of the OCR can be improved and compression of data volume becomes more effective.

According to the present apparatus for transmitting read data, the document reading means reads the document based on a set content, so that document data processing can be performed based on a content set up by the user. The data compression means compresses the read data with a designated file format (compression, resolution, color/black-and-white etc.), so the scanned data is compressed effectively. The transmission capacity limitation confirmation means performs a check on the transmission capacity limitation set up for each data transmission means, so transmission error caused by erasing of transmitted data at the destination (such as a relay server) due to overload of mail capacity limitation and the like can be prevented from occurring before transmission. When the volume of compressed data for transmission is within the limited range of transmission capacity set for the data transmission means, the read data can be transmitted to a destination designated by the user through the data transmission means designated by the user.

According to the present apparatus for transmitting read data, if the data volume compressed for transmission exceeds the limitation of transmission capacity set for the data transmission means, the transmission capacity limitation confirmation means determines whether there are plural data transmission means set up other than the initially designated data transmission means, and at the same time, determines whether the other data transmission means can transmit data with larger transmission volume than the initially determined transmission means, and if the other data transmission means is capable of transmitting larger data, judges whether the data volume compressed for transmission and subjected to data processing falls within the limited range of transmission capacity set for the other data transmission means. When there are multiple data transmission means, by registering in advance, the data transmission means can be changed without varying the data processing means. If the data volume compressed for transmission falls within the limited range of the transmission capacity set for the other data transmission means, the read data can be transmitted to the destination designated by the user via the other data transmission means that is different from the data transmission means initially designated by the user.

According to the present apparatus for transmitting read data, when it is determined that with the data transmission means set up by the user, the data volume compressed for transmission exceeds the transmission capacity limitation set for the data transmission means, the field separation means carries out field separation for each page of the total data that the user is trying to transmit, and the transmission capacity limitation confirmation means designates the order for performing recompression of each page according to the size of the text field and/or the graphic field. The data is then subjected to recompression one page at a time according to the designated order, and every time a page is recompressed, the compressed data volume is checked to see if it falls within the limited range of transmission capacity set for the other data transmission means. When it is determined that data transmission is possible, the read data is transmitted to a destination designated by the user using the other data transmission means designated by the user. Thus, by further enhancing the data compression rate, the file volume is cut down by compression, and occurrence of error during data transmission can be prevented.

Field separation is carried out so as to suppress the deterioration of graphic image as much as possible, and recompression process is carried out one page at a time in the order starting with the page expected to have the highest effect, so that the deterioration of image of the pages is suppressed to a minimum and compression effect is enhanced as much as possible.

According to the present apparatus for transmitting read data, after the field separation means separates the fields of each page of the whole data to be transmitted, if it is determined that a page subjected to field separation consists only of a text field, the resolution of that particular page is degraded. Every time a data corresponding to one page is compressed (resolution is degraded), whether or not the data volume compressed for transmission falls within the limited range of transmission capacity set for the other transmission means is checked, and when it is considered that there is no problem in transmitting the data, the read data is transmitted to the destination designated by the user via the other data transmission means designated by the user. When the page consists only of a text field, the resolution can be degraded to half the original value to thereby cut down the file volume to one-fourth, and by further utilizing a compression format, the file volume can be cut down even more.

Even after compression, if the text data maintains a certain level of resolution, the text data can be recognized not only through the human eye but also via OCR.

According to the present apparatus for transmitting read data, the field separation means determines whether the document is a color document or a black-and-white document during field separation of the document being read in, and when it is determined that the document being subjected to field separation is a black-and-white document, the page data of the document is converted to black-and-white image, and then a check is performed to see if the data volume compressed for transmission falls within the limited range of transmission capacity set for the other data transmission means. When it is determined that there is no problem in carrying out data transmission, the data is transmitted to the destination designated by the user via the other data transmission means designated by the user. By handling the black-and-white document as black-and-white data and not as color data, the file volume can be cut down to approximately one-fourth, and in the case of text data, the OCR processing can be facilitated advantageously.

What is claimed is:

1. An apparatus for transmitting read data having a scanner function, a data transmission function and a data compression function, the apparatus comprising:
   a document reading means for reading a document having been subjected to data processing of a predetermined content;
   a data compression means for compressing the data read from the document with a designated file format;
   a data transmission means for transmitting the compressed data to a selectable destination; and
   a transmission capacity limitation confirmation means for confirming a limitation on a transmission capacity set for each data transmission means, said transmission capacity limitation confirmation means having a function of transmitting the read data to a designated destination via a designated data transmission means when it is confirmed that a data volume compressed for transmission falls within the limited range of transmission capacity set for said data transmission means,
   wherein said transmission capacity limitation confirmation means comprises a function of determining whether a plurality of other data transmission means different from the initially designated data transmission means are set up when it is confirmed that said data volume compressed for transmission exceeds the limited range of transmission capacity set for said data transmission means;
   a function of determining whether said other data transmission means is capable of transmitting data with larger transmission volume than the initially designated data transmission means;
   a function of determining whether said data volume compressed for transmission falls within the limited range of transmission capacity set for said other data transmission means when said other data transmission means is capable of transmitting data with larger transmission volume than the initially designated data transmission means; and
   a function of transmitting the read data to a set designation via said other data transmission means different from the initially designated data transmission means when it is determined that said data volume compressed for transmission falls within the limited range of transmission capacity set for said other data transmission means.

2. The apparatus for transmitting read data according to claim 1, wherein the apparatus further comprises a field separation means, the field separation means having a function of performing field separation of a text field and a graphic field within each page of the whole data to be transmitted when it is determined that said data volume compressed for transmission exceeds the limited range of transmission capacity set for said other data transmission means; and
   said transmission capacity limitation confirmation means comprises a function of designating an order for performing recompression process of each page in the order of size of the text field or the graphic field determined by field separation; a function of carrying out the recompression process one page at a time in said designated order; a function of determining whether said data volume compressed for transmission falls within the limited range of transmission capacity set for said other data transmission means whenever a page is recompressed; and a function of transmitting the read data to the set destination via said other data transmission means when it is determined that the data volume compressed for transmission falls within the limited range of transmission capacity set for said other data transmission means.

3. The apparatus for transmitting read data according to claim 2, wherein said transmission capacity limitation confirmation means comprises a function of determining whether a page consists of only the text field as a result of said field separation means performing field separation of all the pages of the data to be transmitted, and a function of degrading a resolution of the page when it is determined that the page consists of only the text field by field separation.

4. The apparatus for transmitting read data according to claim 2, wherein said field separation means comprises a function of performing field separation of the read document, and said transmission capacity limitation confirmation means comprises a function of determining whether the document having been subjected to field separation is a black-and-white document, and a function of converting a page data of the black-and-white document to a black-and-white image when it is determined that the document having been subjected to field separation is a black-and-white document.

* * * * *